April 28, 1959 W. M. SCOTT, JR., ET AL 2,884,548
BUS DUCT UNIT FOR ELECTRICAL DISTRIBUTION SYSTEM
Filed April 3, 1957 4 Sheets-Sheet 1
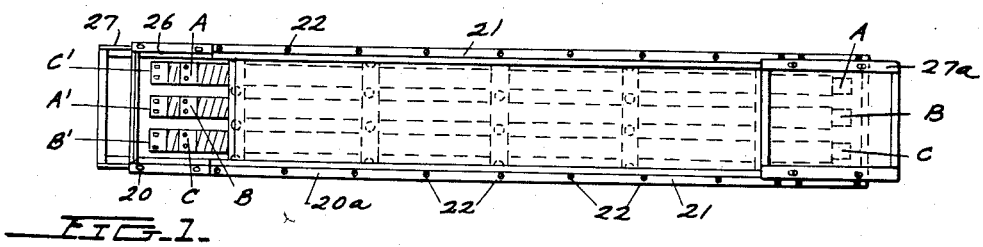
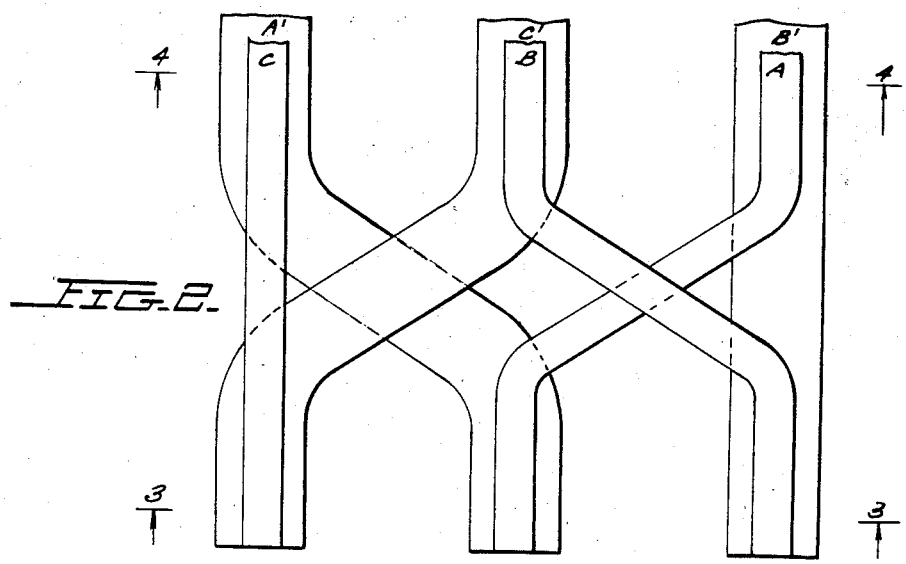
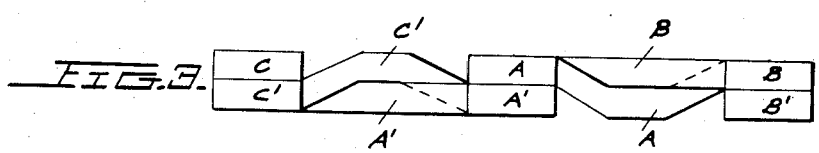
INVENTOR.
WILLIAM M. SCOTT, JR.
JOHN B. CATALDO
BY
ATTORNEYS April 28, 1959  W. M. SCOTT, JR., ET AL  2,884,548
BUS DUCT UNIT FOR ELECTRICAL DISTRIBUTION SYSTEM
Filed April 3, 1957  4 Sheets-Sheet 3

INVENTORS
WILLIAM M. SCOTT, JR.
JOHN B. CATALDO
BY
ATTORNEYS

April 28, 1959  W. M. SCOTT, JR., ET AL  2,884,548
BUS DUCT UNIT FOR ELECTRICAL DISTRIBUTION SYSTEM
Filed April 3, 1957  4 Sheets-Sheet 4
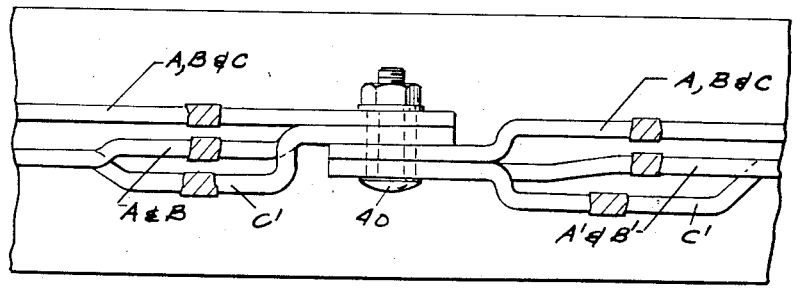
FIG. 10.
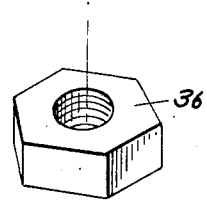
FIG. 11.
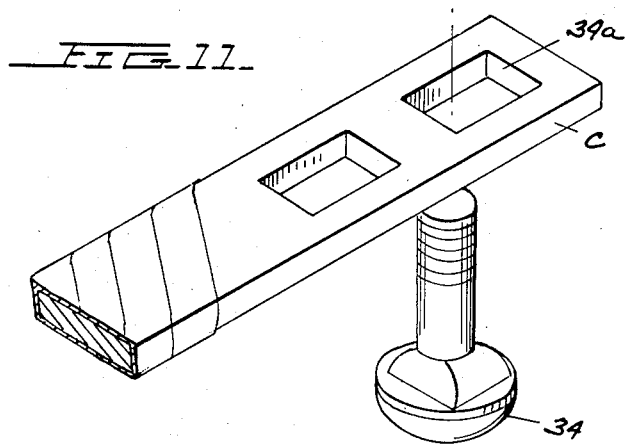
INVENTORS
WILLIAM M. SCOTT, JR.
BY JOHN B. CATALDO
ATTORNEYS

United States Patent Office 2,884,548
Patented Apr. 28, 1959

2,884,548

BUS DUCT UNIT FOR ELECTRICAL DISTRIBUTION SYSTEM

William M. Scott, Jr., Bryn Mawr, Pa., and John B. Cataldo, Birmingham, Mich., assignors, by mesne assignments, to I-T-E Circuit Breaker Company, Philadelphia, Pa., a corporation of Pennsylvania Application April 3, 1957, Serial No. 650,462

9 Claims. (Cl. 307—147)

This invention relates to a bus duct unit construction of the type shown in U.S. Patent No. 2,287,502 to A. A. Togesen et al. wherein equal current distribution between the bus bars of a pair is assured by offsetting the buses of a common phase at each end of the bus duct unit and connecting them to one another as well as to the associated buses of an adjacent bus duct unit.

In the above-mentioned patent, a bus duct construction is described wherein a pair of buses are provided for each phase of a multi-phase system and each individual bus is then paired in a close-spaced relationship with respect to the bus of another phase which results in a substantially 180° phase displacement between the currents of adjacent close-spaced buses.

The complete bus duct system is formed of individual bus duct units which are connectible to one another and these individual bus duct units are constructed to have openings therein to allow electrical connecting access to the buses.

It is, however, possible that the bus duct will be so mounted as to allow electrical connection throughout a substantial length of the system to the same buses of each pair to thereby cause a current unbalance in the buses of the system. That is to say, since each of three phases A, B and C are formed of a pair of buses A—A', B—B', and C—C' respectively, it is possible that the individual buses A, B and C, or A', B' and C' will carry substantially all of the load current of the system.

In copending application Serial No. 643,373, filed March 1, 1957, entitled Bus Duct Unit for Electrical Distribution System, to John A. Herrmann, and assigned to the assignee of the instant invention, a bus unit construction was shown wherein each pair of buses of a common phase within a bus duct unit are connected together by a jumper means. The principle of our invention is to obtain the same result as that of the above-mentioned application, but without the additional parts and manufacturing operations required by offsetting the bus bars at each end of the bus duct unit so that bus bars of a common phase will lie adjacent to one another and will be positioned adjacent to the corresponding buses of a second bus duct unit with which the first is to be connected.

It is to be noted that our novel bus unit construction not only simplifies manufacturing procedures but it also has a lesser effect upon current unbalance due to differences in reactance of the bus bars of a single pair of view of the more symmetrical connections.

Accordingly, a primary object of this invention is to prevent current unbalance in the bus bars of low reactance bus duct units comprising a pair of buses or conductors for each phase of multi-phase system.

Another object of this invention is to construct the buses of a low reactance bus duct unit so that they will be offset at either end to bring buses of a common phase adjacent to one another.

These and other objects of this invention will become more apparent from the following description when taken in connection with the drawings, in which:

Figure 1 shows a top view of the type of bus duct unit which could be modified in accordance with this novel invention.

Figure 2 schematically illustrates the bus configuration of one end of a bus duct unit such as that of Figure 1 when these buses are offset in accordance with this invention.

Figure 3 shows a cross-sectional view of Figure 2 when taken across the line 3—3.

Figure 4 shows a cross-sectional view of Figure 2 when taken across the line 4—4.

Figure 10 is a view similar to that of Figure 9 and illustrates a simplified type of fastening between the bus bars of a similar phase.

Figure 11 shows a perspective view of the square shouldered bolt utilized in connecting the buses of this invention.

Figure 5:
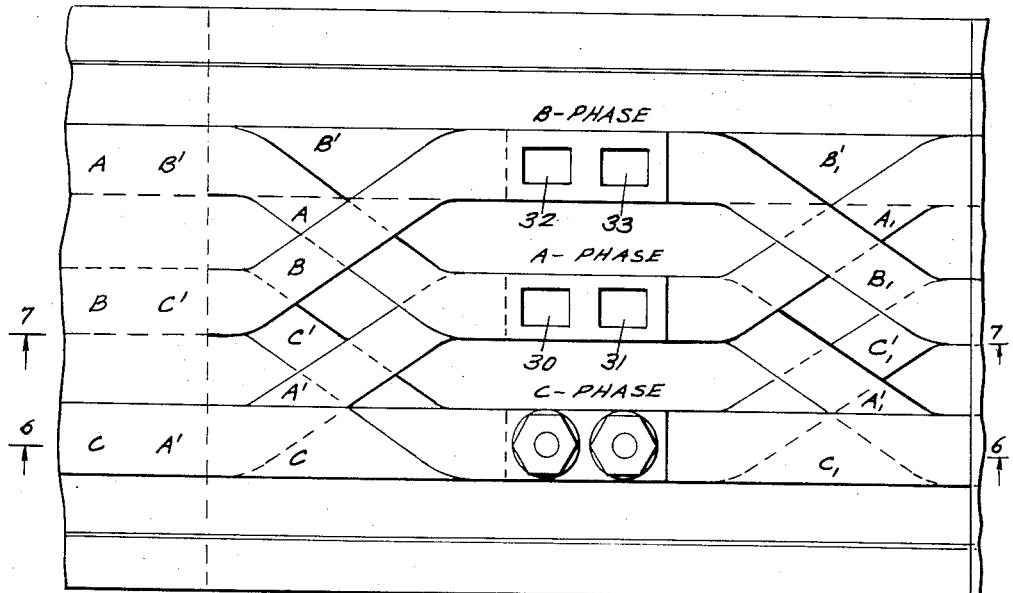
Figure 5 shows a top view of the ends of two bus duct units, each of which is of the type shown in Figure 1 when adapted to be interleaved as has been shown in connection with Figure 2.

Referring now to Figure 1, it is seen that the bus duct unit shown therein consists of two identical steel halves 20 and 21a. The two steel halves 20 and 20a are provided with flanges 21 which are bolted together by bolts 22 to form the complete outside housing. It is further seen that the steel halves or bus duct sections 20 and 20a are longitudinally offset from one another to provide scarf lap joints for joining to adjacent bus duct units with a high strength, interlocked joint.

The buses A, B, C and A', B' and C' are supported within the housing in any desired manner such as that set forth in copending application Serial No. 643,373 filed March 1, 1957, so that buses A—C', B—A' and C—B' respectively are in a close spaced relationship as set forth in U.S. Patent No. 2,287,502. Buses A—A', B—B' and C—C' are then energized from the three respective phases of a three phase source.

In order to provide access to make electrical connection between the bus duct units, openings such as opening 26 in duct half 20 which is coverable by a cover 27 and a similar opening in duct half 20a which is coverable by a cover 27a are provided. If desired, further openings along the duct halves may be provided to make electrical tap connections to the buses contained within the bus housing.

When only one set of buses is available for electrical connection, as would be the case when the bus duct is mounted along a wall or ceiling to only expose buses C', A' and B' or A, B and C, it is possible that a severe current unbalance would occur to thereby overload the individual buses concerned. If, however, the buses corresponding to a single phase are interconnected within each bus duct unit, it is clear that this condition may be avoided.

Figure 2 illustrates the novel offset construction of this invention for bringing the buses of a similar phase adjacent to one another at each end of the bus duct where only one end is shown.

In Figure 2, the upper layer of buses A, B and C is shown as being narrower than the lower buses A', B' and C'. This however, is done only to make it easier to follow the bus bar paths and it is to be understood that normally all of the bus bars are of the same dimensions.

As shown in Figure 4, during the long run of the bus bars within their bus duct unit, each bus is positioned to be adjacent to a second bus which results in a substantially 180° phase displacement between the bus currents in accordance with the principles set forth in the above noted U.S. Patent No. 2,287,502. When, however, the bus reaches the end of its particular unit, then as is seen in Figure 3, buses A, B, C' and A' are offset from the positions of Figure 4 to those of Figure 3 so that the buses of corresponding phases may be interconnected to assure freedom from current unbalance between these buses.

Figure 6:
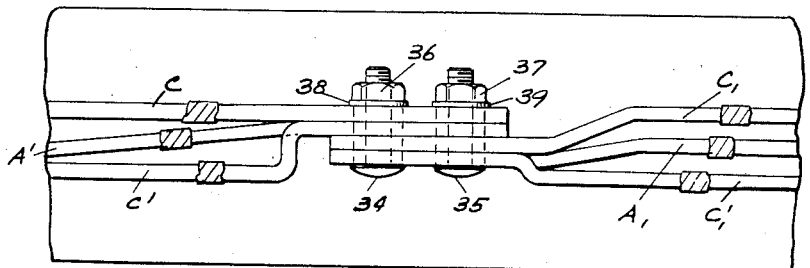
Figure 6 is a view of Figure 5 taken across the line 6—6.
Figure 7:
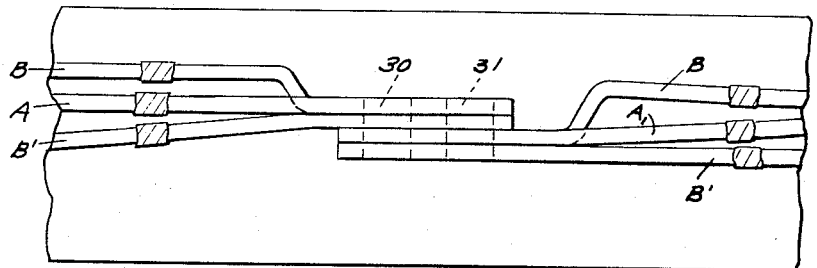
Figure 7 is a view of Figure 5 taken across the line 7—7.

The offset arrangement described in Figures 2, 3 and 4 is shown as applied to a pair of bus duct unit ends which are to be joined as is seen in the embodiment of Figures 5, 6 and 7. In these figures, the left hand bus bars correspond to a first bus duct unit, the buses being identified as were the buses of Figures 2, 3 and 4, while the buses of the right hand side of the figure correspond to a second bus duct unit with its buses being identified in a manner similar to that of Figures 2, 3 and 4, but having an added subscript to distinguish them from the first unit.

As previously mentioned, it is desirable that buses A, A', $A_1$, and $A_1'$ be electrically connected together at the junction of the two bus duct units. Thus it will be assured that a pair of buses corresponding to any one phase will be subjected to an equal current distribution and of course the continuity of the buses of any one phase when going from bus duct unit to bus duct unit will be assured.

As may be seen more specifically in Figure 5, the end of each bus is provided with two rectangular holes such as the rectangular holes 30 and 31 in bus bar A and rectangular holes 32 and 33 in bus bar B.

The manner in which buses C, C', and $C_1'$ are fastened is specifically shown in Figure 6 where it is seen that after their rectangular slots such as slots 30, 31, 32 and 33 of Figure 5 are aligned, a pair of bolts 34 and 35 which have a rectangular shoulder to cooperate with the shape of the rectangular opening in the buses is inserted through these openings and maintained in position by nuts 36 and 37 respectively, which operate through washers 38 and 39 respectively.

This nut and bolt connection may be seen more specifically in connection with Figure 11 which shows the bolt 34 as having the rectangular shoulder which protrudes through a rectangular hole 34a in the bus C. The rectangular shoulder is then terminated in a thread which cooperates with the bolt 36. Clearly, as is seen in Figure 6, the shoulder of bolt 34 will protrude into at least a portion of rectangular hole 34a of bus C. Hence, when the nut 36 is tightened, the bolt 34 will be maintained in its predetermined angular position in view of the cooperation between its shape and the shape of the holes through which it protrudes.

In a like manner, the buses A, A', $A_1$ and $A_1'$ as is seen in Figure 7 will be fastened together by the insertion of bolts similar to bolts 34 and 35 through the openings such as openings 30 and 31 which are aligned for each of the bus bars.

It is to be noted that this bolt connection for electrically connecting all of the buses of a particular phase can be made from either side of the bus duct units. Thus, in the event that one side of the bus duct unit is not accessible in view of a particular type of mounting of the bus duct unit, it is possible that the interconnection may be made from the other side.

It is to be further noted that with the exception of buses B' and C, that each of the other buses of the system have the same type of offset and each of the buses is provided with an identical type of rectangular opening to allow fastening. This construction provides extremely simple manufacturing techniques to be utilized and allows extremely simple assembly and installation.

Figure 8:
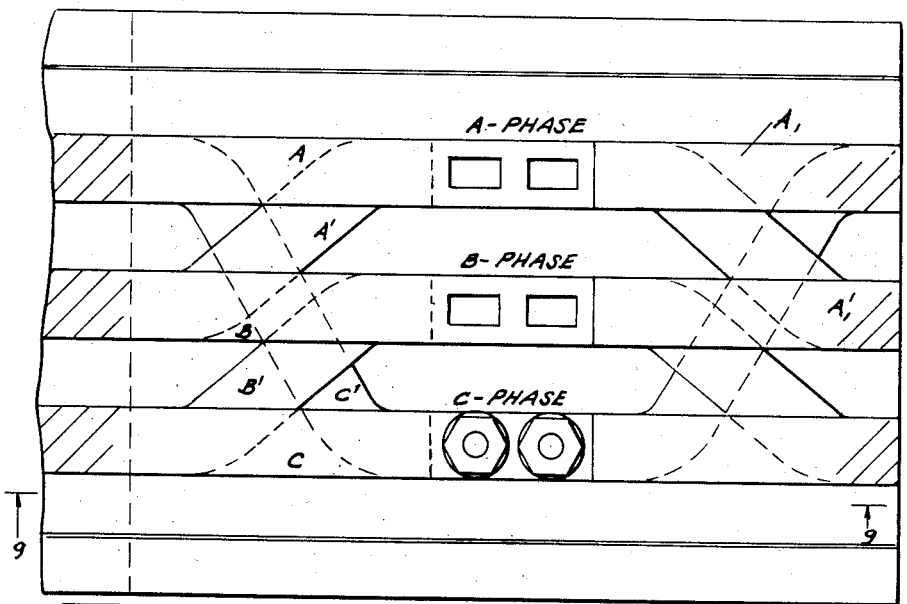
Figure 8 is similar to Figure 5 but shows a system wherein only the bottom buses are offset.

A second embodiment of this invention is shown in Figure 8 in which all of the upper bus bars A, B and C are straight, while only bus bars A', B' and C' are offset so as to bring buses of a common phase adjacent one another at the end of the bus duct unit. Thus, as may be seen in Figure 8, bus A' of the left hand bus duct unit and $A_1'$ of the right hand bus duct unit are each offset so as to join one another and buses A and $A_1$ at a common point. Similarly, each of the other two phases are constructed in the same manner.

Figure 9:
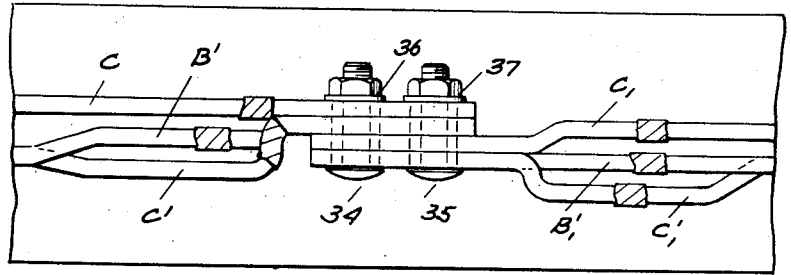
Figure 9 shows a view of Figure 8 when taken across the lines 9—9.

As may be seen in Figure 9, the same type of connection is utilized as was utilized in Figure 5 and the bolts 34 and 35 of Figure 9 pass through rectangular and aligned openings of bus bars C, C', $C_1$ and $C_1'$ to be fastened by the nuts 36 and 37. Once again the bolts 34 and 35 are provided with rectangular shoulders so as to prevent rotation of bolts 34 and 35 while their associated nuts 36 and 37 are being tightened.

Figure 9 further illustrates that the bus bars C', B' and C are provided with an insulating tape which ends only at the points of interconnection of the common buses. This insulating tape is preferably provided for each of the buses of the structure of Figures 8 and 9 as is the case for the structure of Figures 5, 6 and 7.

Here again the same advantages are provided as in the case of Figure 5, since the buses of a common phase are all interconnected as is desired, and this connection may be made from either side of the bus duct units.

If desired, only one bolt need be provided for interconnecting a group of bus bars. This is shown in Figure 10 which is similar to Figure 9 with the exception of the single bolt 40 having a rectangular shoulder for cooperating with a single set of aligned rectangular holes in the bus bars C, C', $C_1$ and $C_1'$, and operates in a manner set forth in conjunction with Figure 11.

Although we have here described preferred embodiments of this invention, many modifications and variations will now be apparent to those skilled in the art and we desire to be limited, not by the specific disclosure herein, but only by the appended claims.

What is claimed is:

1. A multiphase bus duct comprised of individual series connectible bus duct units; each of said individual bus duct units comprising a pair of buses for each phase supported within a housing; each of said buses being positioned with respect to one another to provide a low reactance system; at least one bus of each of said pairs of buses being off-set at each end of said bus duct unit to place buses of the same phase adjacent to one another.

2. A multiphase bus duct comprised of individual series connectible bus duct units; each of said individual bus duct units comprising a pair of buses for each phase supported within a housing; each of said buses being positioned with respect to one another to provide a low reactance system; at least one bus of each of said pairs of buses being off-set at each end of said bus duct unit to place buses of the same phase adjacent to one another; means for connecting each of said pair of buses adjacent one another at the end of each bus duct unit and a corresponding pair of buses of a bus duct unit to be connected thereto.

3. A bus duct unit for a multiphase bus duct system; said bus duct unit comprising a pair of buses for each phase supported within a housing; each of said buses being positioned with respect to one another to provide a low reactance system; at least one bus of each of said pairs of buses being off-set at each end of said bus duct unit to place buses of the same phase adjacent to one another and in electrical contact.

4. A bus duct unit for a multiphase bus duct system; said bus duct unit comprising a pair of buses for each phase supported within a housing; each of said buses being positioned in close-spaced relationship with a bus of a different phase, the currents in said buses in close-spaced relationship being substantially 180° phase displaced from one another; at least one of said buses of each of said pairs being off-set at each end of said bus duct unit to place buses of the same phase adjacent to one another and electrically connectible to one another.

5. A bus duct unit for a multiphase bus duct system; said bus duct unit comprising a pair of buses for each phase supported within a housing; each of said buses being positioned in close-spaced relationship with a bus of a different phase, the currents in said buses in close-spaced relationship being substantially 180° phase displaced from one another; at least one of said buses of each of said pairs being off-set at each end of said bus duct unit to place buses of the same phase adjacent to one another; means for connecting each of said pair of buses adjacent one another at the end of each bus duct unit and a corresponding pair of buses of a bus duct unit to be connected thereto.

6. A bus duct unit for a three-phase bus duct system; said bus duct unit comprising a pair of buses for each phase supported within a housing; each of said buses having a relatively flat cross-section; one bus of each of said three phases being coplanar in a first plane; the other bus of each of said three phases being coplanar in a second plane; each bus in said first plane being positioned adjacent to a bus in said second plane; the currents of each pair of buses positioned adjacent to one another being substantially 180° phase displaced with respect to one another; at least one bus of each of said pairs of buses being off-set at each end of said bus duct unit to place buses of the same phase adjacent to one another and electrically connectible to one another.

7. A bus duct unit for a three-phase bus duct system; said bus duct unit comprising a pair of buses for each phase supported within a housing; each of said buses having a relatively flat cross-section; one bus of each of said three phases being coplanar in a first plane; the other bus of each of said three phases being coplanar in a second plane; each bus in said first plane being positioned adjacent to a bus in said second plane; the currents of each pair of buses positioned adjacent to one another being substantially 180° phase displaced with respect to one another; at least one bus of each of said pairs of buses being off-set at each end of said bus duct unit to place buses of the same phase adjacent to one another; means for connecting each of said pair of buses adjacent one another at the end of each bus duct unit and a corresponding pair of buses of a bus duct unit to be connected thereto.

8. A bus duct unit for a three phase bus duct system; said bus duct unit comprising a pair of buses for each phase supported within a housing; each of said buses having a relatively flat cross-section; one bus of each of said three phases being coplanar in a first plane; the other bus of each of said three phases being coplanar in a second plane; each bus in said first plane being positioned adjacent to a bus in said second plane; the currents of each pair of buses positioned adjacent to one another being substantially 180° phase displaced with respect to one another; each of said buses coplanar in said first plane being off-set at each end of said bus duct unit and positioned adjacent and electrically connectible to buses of the same phase in said second plane.

9. A bus duct unit for a three phase bus duct system; said bus duct unit comprising a pair of buses for each phase supported within a housing; one bus of each of said three phases being coplanar in a first plane; the other bus of each of said three phases being coplanar in a second plane; each bus in said first plane being positioned adjacent to a bus in said second plane; the currents of each pair of buses positioned adjacent to one another being substantially 180° phase displaced with respect to one another; two of said buses in said first plane and two of said buses in said second plane being off-set at each end of said bus duct unit for positioning buses of the same phase in adjacent electrically connectible relationship with one another.

References Cited in the file of this patent
UNITED STATES PATENTS

| | | |
|---|---|---|
| 2,242,867 | Martin | May 20, 1941 |
| 2,262,067 | Togesen et al. | Nov. 11, 1941 |
| 2,287,502 | Togesen et al. | June 23, 1942 |